(12) United States Patent
Simons et al.

(10) Patent No.: US 10,620,848 B2
(45) Date of Patent: Apr. 14, 2020

(54) METHOD TO REDUCE AGING OF A CACHE MEMORY

(71) Applicant: INTRINSIC ID B.V., Eindhoven (NL)

(72) Inventors: Petrus Wijnandus Simons, Eindhoven (NL); Svennius Leonardus Maria Goossens, Eindhoven (NL)

(73) Assignee: INTRINSIC ID B.V., Eindhoven (NL)

( * ) Notice: Subject to any disclaimer, the term of this patent is extended or adjusted under 35 U.S.C. 154(b) by 6 days.

(21) Appl. No.: 16/028,526

(22) Filed: Jul. 6, 2018

(65) Prior Publication Data

US 2019/0034096 A1 Jan. 31, 2019

(30) Foreign Application Priority Data

Jul. 25, 2017 (EP) ..................................... 17183111

(51) Int. Cl.
*G06F 3/06* (2006.01)
*H04L 9/32* (2006.01)
(Continued)

(52) U.S. Cl.
CPC ........ *G06F 3/0616* (2013.01); *G06F 12/0893* (2013.01); *G06F 12/1054* (2013.01);
(Continued)

(58) Field of Classification Search
CPC .. G06F 3/0616; G06F 3/0679; G06F 12/0893; G06F 12/1054; G06F 9/0877;
(Continued)

(56) References Cited

U.S. PATENT DOCUMENTS 5,379,402 A * 1/1995 Fujihara .............. G06F 12/0835
711/141
5,991,851 A 11/1999 Alwais et al.
(Continued)

FOREIGN PATENT DOCUMENTS

EP 3046096 A1 * 7/2016 ............... G09C 1/00
WO 2012/069545 5/2012

OTHER PUBLICATIONS

Aysu, A., Gulcan, E., Moriyama, D., Schaumont, P., Yung, M.: End-to-end design of a PUF-based privacy preserving authentication protocol. In: Güneysu, T., Handschuh, H. (eds.) CHES 2015. LNCS, vol. 9293, pp. 556-576. Springer, Heidelberg. (Year: 2015).*
(Continued)

*Primary Examiner* — Ramon A. Mercado
(74) *Attorney, Agent, or Firm* — Nixon & Vanderhye P.C.

(57) ABSTRACT

An aspect concerns an electronic cryptographic device (100), comprising
a cache memory configured to cache a further memory,
a mask storage configured for storing a mask,
a mask generator configured to generate the mask and to store the mask in the mask storage,
a cache write mechanism configured to write a content of the further memory in the cache memory masked with the mask stored in the mask storage,
a cache read mechanism configured to read a content of the cache memory unmasked with the mask stored in the mask storage.

15 Claims, 3 Drawing Sheets

(51) Int. Cl.
*H04L 9/08* (2006.01)
*G06F 12/0893* (2016.01)
*G06F 12/1045* (2016.01)

(52) U.S. Cl.
CPC .......... *H04L 9/0877* (2013.01); *H04L 9/3278* (2013.01); *G06F 3/0679* (2013.01); *H04L 2209/04* (2013.01); *H04L 2209/12* (2013.01)

(58) Field of Classification Search
CPC .............. G06F 9/3278; H04L 2209/04; H04L 2209/12
See application file for complete search history.

(56) References Cited

U.S. PATENT DOCUMENTS

| | | | | |
|---|---|---|---|---|
| 8,694,856 | B2* | 4/2014 | Tuyls | G06F 21/73 714/763 |
| 2013/0194886 | A1* | 8/2013 | Schrijen | G06F 7/588 365/226 |
| 2014/0016776 | A1* | 1/2014 | Van Foreest | G06F 21/72 380/46 |
| 2015/0106567 | A1* | 4/2015 | Godard | G06F 9/3828 711/121 |
| 2015/0234751 | A1* | 8/2015 | Van Der Sluis | H04L 9/0866 713/193 |
| 2016/0110130 | A1* | 4/2016 | Kan | G06F 21/79 711/163 |
| 2018/0040356 | A1* | 2/2018 | Hung | G06F 13/42 |
| 2018/0210839 | A1* | 7/2018 | Bacha | G06F 12/0893 |
| 2019/0034096 | A1* | 1/2019 | Simons | G06F 3/0616 |
| 2019/0116052 | A1* | 4/2019 | Kim | G06F 7/588 |

OTHER PUBLICATIONS

R. Mæs et al., "Countering the Effects of Silicon Aging on SRAM PUFs", 2014 IEEE International symposium on hardware-oriented security and trust, 2014, 6 pages.
D. McGrew et al., "The Galois/Counter Mode of Operation (GCM)", International Conference on Cryptology, 2004, 43 pages.
Roel Maes et al; "*Experimental Evaluation of Physically Unclonable Functions in 65 nm CMOS*", INSPEC Accession No. 13135455, IEEE Xplore, Nov. 12, 2012.
Ayden Aysu et al, "*End-to-end Design of a PUF-based Privacy Preserving Authentication Protocol*", Cryptology ePrint Archive, Report 2015/937, IACR-CHES-2015, Sep. 24, 2015.

* cited by examiner

METHOD TO REDUCE AGING OF A CACHE MEMORY

This application claims priority to EP Patent Application No. 17183111.8 filed 25 Jul. 2017, the entire contents of which is hereby incorporated by reference.

FIELD OF THE INVENTION

The invention relates to a cryptographic device, a cryptographic method and a computer readable medium.

BACKGROUND

Physical unclonable functions (PUFs) have proven to be advantageous alternatives for many forms of secure identification, including the storing of keys, identifiers and the like in secure memories.

A physical unclonable function exploits manufacturing variations to derive a digital identifier. The digital identifier is thus tied to a physical medium. Because the physical unclonable function depends on random process variation, it is easy to create a PUF but it is very hard, if not downright impossible, to create a PUF which would give rise to a particular pre-determined identifier. The manufacturing variations lead to different physical characteristics of the memory element. For example, the physical characteristics may include: doping concentrations, oxide thickness, channel lengths, structural width (e.g. of a metal layer), parasitic (e.g. resistance, capacitance). When a digital circuit design is manufactured multiple times, these physical characteristics will vary slightly and together they will cause the behavior of an IC element, e.g., a memory element, to behave differently in some situations. For example, the start-up behavior is determined by manufacturing variations in the physical characteristics.

This property of PUFs makes them suitable for a range of applications. For example, PUFs may be used to combat counterfeiting. Although, it may be possible to fraudulently copy a particular device or other manufactured item, it would not be possible to duplicate a PUF which could be embedded therein with sufficient precision so that it would give rise to the same digital identifier as the original. As a further example, PUFs are used to create cryptographic keys. Using a PUF the need for secure memory to store a key is circumvented. A PUF furthermore provides natural protection against illegal attempts to obtain the cryptographic key through reverse engineering, since damage which could be inflicted to the PUF during the attempt would change the digital identifier. Preferably, the digital identifier is unique for the electronic device wherein the physical unclonable function is embedded.

PUFs have been advantageously applied in electronic devices. Even tiny manufacturing variations which are unavoidable during manufacture of an IC lead to different properties of the IC. These different properties are normally suppressed, in an effort to obtain a batch of ICs that operate in the same manner. However, to create a PUF the differences among individual ICs in a batch of ICs are exploited.

For example, it has been observed that the startup behavior of some memory elements, demonstrate PUF like behavior. When such memory is powered-up, it tends to contain content, i.e., comprise a sequence of data values, which depends on the at least partially random physical characteristics of the components, e.g., gates or transistors, which make up the memory, e.g., their physical arrangement relative to each other. If the memory is powered-up multiple times, it would contain, up to a large percentage, the same content. Unfortunately, since the PUF behavior depends on small fluctuations, a certain error percentage is unavoidable. An error correction procedure, using so-called helper data, can be used to correct for these fluctuations, and make sure an identical digital identifier is derived, each time the PUF is used.

PUFs are also applied in cryptographic security solutions wherein secret key(s) need to be stored somewhere in a system. For example, a secure key management solution may be based on PUF technology; in particular on SRAM-PUFs. This technology is able to extract identifiers from the uniqueness that is inherent to every piece of silicon. The secret keys may be reconstructed without having to store those keys. PUF-based keys are bound to a device in such a way that it is hard to clone, copy or otherwise extract them from the device. SRAM memory is however a precious commodity. Even if a sufficient amount of SRAM memory is available, some applications may not want to reserve the SRAM only for cryptographic key generation or storage. There is a need to reduce the amount of memory needed for physical unclonable functions.

SUMMARY OF THE INVENTION

To address these and other concerns an electronic cryptographic device is provided. The device comprises a cache memory configured to cache a further memory, a mask storage configured for storing a mask, a mask generator configured to generate the mask and to store the mask in the mask storage, a cache write mechanism configured to write a content of the further memory in the cache memory masked with the mask stored in the mask storage, a cache read mechanism configured to read a content of the cache memory unmasked with the mask stored in the mask storage.

The content of the cache memory can be varied without impacting the cache's function by changing the way the content of the cache is masked. This allows the start-up data of the cache memory to be used as PUF data, so that no additional memory is needed to implement the PUF.

An aspect of the invention is a caching method. A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code stored on a computer readable medium for performing a method according to the invention when said program product is executed on a computer.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1 schematically shows an example of an embodiment of a cryptographic device, FIG. 2 schematically shows an example of an embodiment of a cryptographic device, FIG. 3 schematically shows an example of an embodiment of a cryptographic method, FIG. 4a schematically shows a computer readable medium having a writable part comprising a computer program according to an embodiment, FIG. 4b schematically shows a representation of a processor system according to an embodiment.

DETAILED DESCRIPTION OF PREFERRED EMBODIMENTS

Figure 1:
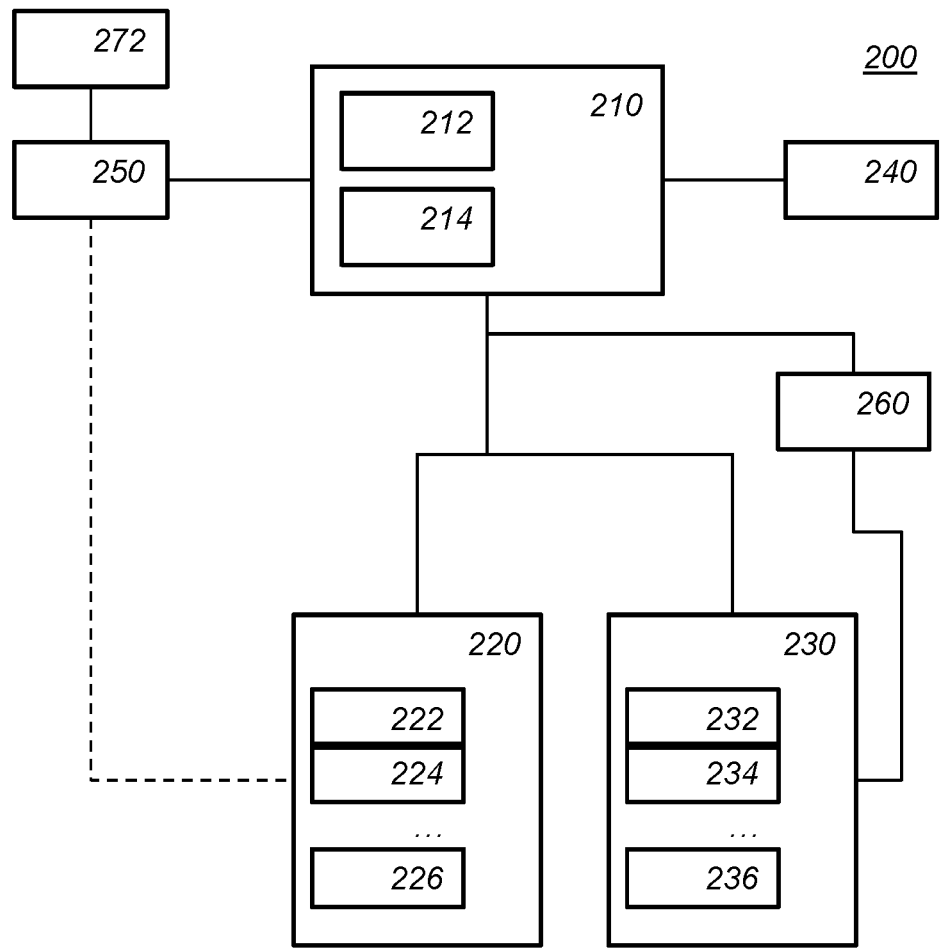

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

Further, the invention is not limited to the embodiments, and the invention lies in each and every novel feature or combination of features described herein or recited in mutually different dependent claims.

When using volatile memory, such as SRAM, e.g., SRAM in a System on Chip (SOC), as PUF to obtain a secret key, it is often required or at least desirable to release this part of SRAM, e.g., when the key is not needed anymore by the cryptographic device or when the key is temporarily stored in a different part of memory. For example, the secret key may only be needed to execute boot software stored in a memory of device 100.

In some systems, the cache, e.g., an instruction or data cache, can be used for this purpose, especially when the secret key is only needed during or shortly after boot. This means that when device 100 is ready processing the SRAM which is used as a PUF, the SRAM will be used as regular memory. A disadvantage is that conventional SRAM PUF anti-aging strategies cannot be applied. For example, in the paper "Countering the Effects of Silicon Aging on SRAM PUFs" PUF aging is explained; the paper is included herein by reference. Silicon aging, in particular NBTI, causes many PUFs to exhibit a natural tendency of growing less reliable over time. This is inconvenient or even unacceptable for in-the-field applications. In case of SRAM PUFs it is observed that the impact of NBTI aging depends on the data stored in the SRAM. The aging of silicon is data-dependent. It is shown that the next best strategy to prevent aging, after full and partial antiaging, is filling the SRAM with random data, in particular random data that is not fixed. For example, after each reconstruction a different randomly generated string may be written to the PUF memory. However, for an SRAM that must be used as a cache, this cannot be done directly as it would overwrite the values that need to be kept in cache.

The cache memory is volatile memory, e.g., SRAM memory. Upon power-up, the cache memory is filled with a noisy bit string. The bit string is not entirely static and may vary a bit from boot to boot. Nevertheless, the string is sufficiently repeatable to compute a key from, possibly using so-called helper data. Such memory content is referred to as a PUF content. In an embodiment, the PUF data is sufficiently stable and unique to uniquely identify the device from a larger batch of devices, or may even allow global identification, e.g., as a globally unique number.

FIG. 1 schematically shows an example of an embodiment of a cryptographic device 200. Cryptographic device 200 is an electric device and comprises a processor 250, e.g., a CPU, a microprocessor, etc. Processor 250 may be a processor circuit. Cryptographic device 200 comprises a further memory 240. During operation processor 250 needs access to memory 240. For example, memory 240 may comprise data on which processor 250 acts, e.g., by reading or writing to memory 240, or instructions, which may be executed by processor 250. Access to memory 240 is improved by a cache controller 210. Cache controller 210 is connected with a cache memory 220 configured to cache the further memory 240. Cache controller 210 comprises a cache write mechanism 212 configured to write a content of the further memory in the cache memory 220, e.g., so that a next time processor 250 needs the same content it can be retrieved from cache memory 220 so that is available quicker. Cache controller 210 comprises a cache read mechanism 214 configured to read a content of the cache memory 220. For example, if a read request for an address in memory 240 arrives in cache controller 210, cache controller may verify if cache memory 220 comprises that requested memory content. If so, read mechanism 214 may retrieve the requested data from cache memory 220 and provide it to processor 250. If not, cache controller 210 may retrieve the data from memory 240, and provide it to processor 250; write mechanism 212 writes the retrieved memory content to cache memory 220.

In an embodiment, cache write mechanism 212 may be configured for write-through or write-back caching, but this is not necessary. For example, cache controller 210 may invalidate the cache or part thereof, upon a write from processor 250 to memory 240.

Cache memory 220 is configurable as a cache or as a directly addressable memory. In particular, upon power-up of device 200 the cache is configured as a directly addressable memory. In an embodiment, this may be automatic, e.g., cache memory 220 starts up as directly addressable memory by default, or this may be a configuration step, e.g., a configuration instruction is executed by processor 250 to configure cache memory 220 as a directly addressable memory, and/or later as to configure it as a cache. Cache memory 220 has the property that it comprises a PUF content upon power-up. For volatile memory such as a cache memory this is a usual property. In particular, this PUF property is shown by SRAM memory. When cache memory 220 is configured as a directly addressable memory, then write mechanism 212 and read mechanism 214 do not operate. It may or may not be the cache that during the time cache memory 220 is configured as a directly addressable memory, that further memory 240 is not accessible by processor 250. For example, processor 250 may execute boot code, which includes deriving a cryptographic key or identifier from the PUF start-up content of cache memory 220 and configuring cache memory 220 to function as a cache; it may be the case that after the latter further memory 240 becomes accessible to processor 250. The boot code, or boot software may be stored in a memory of 200. A first part of the boot software may be configured to derive the cryptographic key and decrypt a second part of the boot software which is encrypted with the cryptographic key. The first and second part of the boot software may be stored in a different memory, or different part of a memory, possibly having different security requirements.

Processor 250 is configured to derive a cryptographic key from the PUF content. Even though the PUF data may have fluctuations, it is known in the art per se how to derive a fixed cryptographic key from a PUF content in spite of said fluctuations. For example, processor 250 may have access to helper data 272. Processor 250 may be configured for an error correction procedure using the helper data to correct for the fluctuations, so that an identical digital identifier is derived each time the PUF is used. For example, processor 250 may retrieve the PUF content, e.g., the start-up content, from cache memory 220 configured as a direct access memory, combine the PUF content with helper data 272, apply the error correction and derive the cryptographic key from the result. Typically, the cryptographic key will be derived from the PUF content during a boot phase of device 200. After the cryptographic key is obtained, the PUF content is no longer needed; processor 250 is configured to configure the cache memory 220 as a cache. For example, configuring cache memory 220 to be used as a cache may comprise configuring cache controller 210, e.g., by writing cache system registers, remapping further memory 240, or the like.

This has the advantage that a cryptographic key can be derived from PUF content, providing all the advantages that that entails, yet no additional dedicated memory needs to be installed on device 200 to achieve this. Unfortunately, as with all memory, cache memory 220 is susceptible to aging effects so that its PUF content may slowly change over time. Countermeasures exist to prevent or slow aging, but these require that particular data is written to the memory. Accordingly, the known countermeasures get in the way of using the memory normally.

In an embodiment, device 200 comprises a System on Chip (SOC). The SOC comprises processor 250, cache controller 210, cache memory 220, mask storage 230 and mask generator 230. Furthermore, the SOC comprises or has access to boot software and helper data 272. For example, the boot software may be stored in a non-volatile memory; boot software and helper data may be stored in volatile memory. Further memory 240 may be external to the SOC.

In order to reduce aging effects in cache memory 220, yet still allow cache memory 220 to be used as a PUF, device 200 comprises a mask storage 230 configured for storing a mask. A mask masks the content of cache memory 220. Cache read mechanism 214 is configured to read a content of the cache memory 220 and to unmask it with the mask stored in the mask storage 230. Cache write mechanism 212 is configured to write a content of the further memory in the cache memory 220 masked with the mask stored in the mask storage 230. Device 200 further comprises a mask generator 260 configured to generate the mask and to store the mask in the mask storage 230.

The mask allows the bits that are physically written into cache memory to be varied without impacting the functional meaning of the bits during the use of the cache. In this way, cache access patterns that are conducive to aging can be avoided. For example, even if the same data is repeatedly written to cache memory 220, if the mask changes then the content of the cache memory also changes.

The mask storage may comprise a single mask for the cache memory 220 but may comprise multiple masks. For example, in an embodiment, cache memory 220 is divided in multiple blocks, shown are blocks 222, 224, and 226, e.g., each block being arranged to cache a specific address range. For example, these blocks may be so-called cache-lines. In an embodiment, a cache block is written and invalidated in its entirety. Mask storage 230 is configured to store multiple masks, shown are masks 232, 234, and 236. Each cache block in cache memory 220 has a mask in mask storage 230 associated thereto. For example, the number of masks and cache blocks may be equal, each block being associated with a different mask. For example, the number of masks may be smaller than the number of cache blocks, two or more blocks being associated with the same mask; each mask may be associated to at least one cache block. The read and write mechanism are configured to use the mask associated with the cache block for the masking and unmasking during reading and writing respectively.

Mask storage 230 may be filled, e.g., during boot, by mask generator 260 and/or when configuring cache memory 220 as a cache. The generation of masks may be done randomly. The mask or masks may be changed during the use of the cache. For example, in the use between two subsequent start-ups of cache memory 220, the masks may be changed. Since the mask is used to unmask the content of the cache, changing for a valid cache block would require changing the cache block as well. For example, in an embodiment, a mask in the mask storage and the corresponding cache block may be updated, e.g., by mask generator 260, so that cache read mechanism 214 continues to provide the correct data. Alternatively, the mask is updated whenever the cache block is invalidated. For example, in an embodiment, cache controller 210 is configured to send a new-signal to mask generator 260 upon invalidation of a cache block. The mask associated with the invalidated cache block is then updated by the mask generator 260. For example, if a cache block is not accurate anymore it can be invalidated. If a cache block is invalidated and/or it will receive new data from memory 240, mask generator 260 may update the mask stored in mask storage 230 for the cache block. Alternatively, mask generator 260 may periodically update the masks in mask storage 230; whenever this is done the corresponding cache line is marked as invalid. If cache blocks can be dirty, then a flush of the cache block may be performed before changing the mask. If a mask is used for multiple cache blocks, then all the cache blocks may be invalidated.

Masking and unmasking operations may be done by an XOR operation, e.g., masking may comprise XOR-ing the mask with the data to be masked; for example, unmasking may comprise XOR-ing the mask with the data to be unmasked. In an embodiment, the mask is of the same size as the cache block, but in an embodiment, the mask is stored in a compressed form and expanded when needed. In particular, the mask as stored in mask storage 230 may be repeated multiple times so that it has the same size, or more, as the corresponding cache block. In an embodiment, masks may be generated randomly. For example, mask generator 260 may write a random mask to mask storage 260 when the mask is to be updated. For example, a random mask in mask storage 230 may be repeated as often as is necessary to mask or unmask a cache block. Expanding a mask has the advantage that it reduces that amount of memory needed for mask storage 230. Extending a mask M, may be written as extend(M) below.

In an embodiment, device 200 comprises an inversion unit configured to periodically invert content of a cache block in cache memory 220. This has the advantage that the cache will receive new data yet does not require an invalidation. For example, the cache blocks may comprise an indicator, e.g., a flag or flags, indicating the inversion status of the cache or cache blocks. The flag corresponding to cache block indicates if the unmasking should additionally comprise an inversion operation. Alternatively, a mask may be inverted and all corresponding cache blocks, this does not require book keeping regarding the state of the cache block. The two inversion operations may be an atomic operation, so that the cache block and corresponding mask are locked during the inversion. For example, the inversion unit may periodically invert each of the cache blocks and corresponding mask, e.g., according to a schedule. Even if periodic inversion is used, the mask may still be updated, e.g., upon invalidation of a cache line.

Instead of using random masks, device 200 may select a new mask according to various optimizations. For example, a new mask generated by the mask generator 260 to update a mask associated with a cache block may depend upon a current content of the cache block. For example, a new mask may depend upon the Hamming distance between the new mask (extend(M1)) and the exclusive-or of the inverse of the current content of a cache block (NOT(C0)) and the newly written data (D1). Taking this data into account has the advantage that it becomes more likely that the content of cache memory 220 is approximately inverted after a mask update.

For example, if a mask has the same size as the corresponding cache block, then the new mask may be computed as M1=NOT(C0) XOR D1, wherein D1 is the newly written data, C0 is the current contents of a cache block, and M1 is the new mask. This has the advantage that the new content of the cache becomes D1 XOR M1 (that is the masked version of data D1), which is equal to D1 XOR NOT(C0) XOR D1=NOT(C0). In other words, the content of the cache is exactly the inverse of the previous content of the cache. If the mask corresponds to multiple cache blocks, then the mask may be selected based on the cache block that is written, e.g., which will store D1 in masked form. The other cache blocks corresponding to the mask may be invalidated. In the latter case, the mask is only optimized for one of the blocks corresponding to the mask; nevertheless the other blocks do receive data using a new mask.

If an extended mask is used, it may not be guaranteed that each bit of the cache can be inverted when new data is loaded into it. However, the mask may be optimized for it. For example, the new mask M1 may be chosen so as to minimize
Hamming_weight(NOT(C0) XOR D1 XOR extend(M1)), or
Hamming_distance(NOT(C0) XOR D1, extend(M1).

For example, suppose the current cache block C0 is n bits, with bits $c_0, \ldots, c_{n-1}$ and new data D1 has bits $d_0, \ldots, d_{n-1}$ and the new mask M1 has l bits $m_0, \ldots, m_{l-1}$. For simplicity, we may assume that l divides n, but this is not needed. For example, the final repeat of the mask may be used only partly if l does not divide n. Bit $m_i$ is used to mask the bits $d_{i+kl}$, so if the majority of bits not($c_{i+kl}$)+$d_{i+kl}$ are 1, then choose bit $m_i$ also as one, and 0 otherwise. To compute bit $m_i$, one could also compute the sum:

$$\sum_{k=0}^{k=\frac{n}{l}-1} (not(c_{i+kl}) + d_{i+kl})$$

Divide the sum by $$\frac{n}{l}$$

and round to obtain mask bit $m_i$. If l does not divide n, then some of these sums for some i get an additional term.

Figure 2:
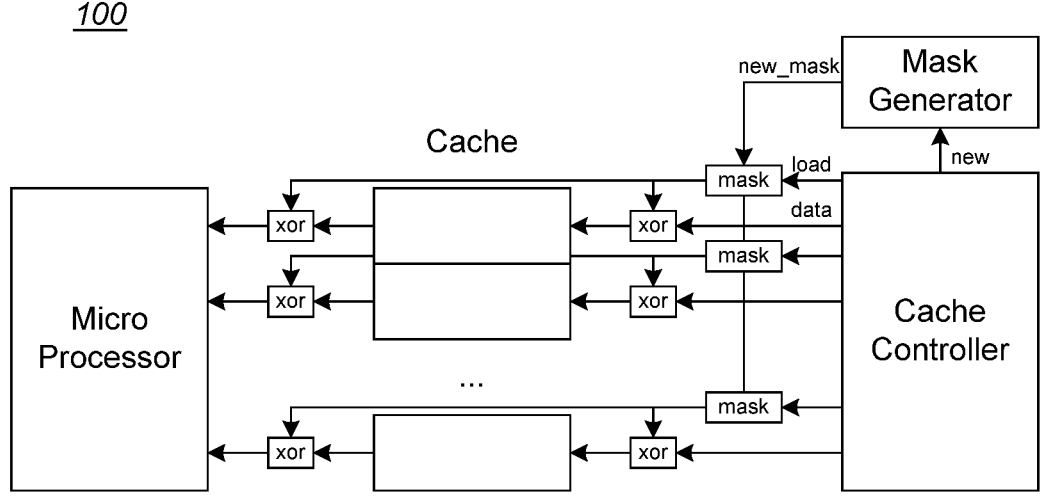

FIG. 2 schematically shows an example of an embodiment of a cryptographic device 100.

The cache memory may be divided into multiple blocks. Each block can cache specific address ranges. When the data to be cached comes from non-volatile memory (NVM), e.g., instruction code, each cache block will only store a limited set of code. This means that each block can get specific aging characteristics. The problem is addressed in device 100 in the following way.

The cache is divided in multiple blocks. Each block has its own, e.g., randomly generated, mask. Every time a cache block is invalidated, the mask is updated (Cache Controller sends a new signal to the Mask Generator), the new mask is stored in the mask register (load) associated with the cache block.

When new data is loaded into the cache block, it is XORed with the random mask. When the cache block is read, it is XORed with the same random mask.

The Mask Generator could use a simple Linear-feedback shift register (LFSR), e.g., of 32 or 64 bits, with maximum repetition loop ($2^{32}$-1 or $2^{64}$-1). It could also use a full-blown random number generator. Maybe some post-processing is needed to ensure that the random data has about 50% hamming weight. When the data that is stored in the cache is variable enough, it may be possible to XOR the stored data, and use the result as the mask for the next block. This requires an extra NextMask register however.

When the cache blocks are invalidated often enough, the similar effect is obtained as with variable random data that is not continuously written (RAND_AA(true) in the paper). When the cache is static for a long time, the behavior will be closer to fixed random data (RAND_AA(fix) in the paper).

When the cache is organized such that it is always invalidated entirely, only one cache block is present, and only one mask can be used.

Instead of the "randomized" Mask Generator, another method of mask generation could be used based on the Hamming weight of the newly written data. This probably costs more hardware, but may improve on the "random" version.

---

M: Mask
C: Masked data into cache
D: Plain data
extend(X): Extend X to the required bit length
C0 = M0 XOR D0
Goal: Invert as many bits as possible, given new data, and current masked data
Given D1, try to make C1 = NOT(C0) as close as possible
When mask is same size as data:
    Make M1 = NOT(C0) XOR D1 (memory would be twice as big to store all masks)
When mask is reduced size:
    Minimize hamming_weight(NOT(C0) XOR D1 XOR extend(M1))
    Minimize Hamming_distance(NOT(C0) XOR D1, extend(M1)
    Per mask bit:
        Calculate hamming_weight(bit column of data)
        Determine mask bit: round(HW/nr_bits in column)

---

The latter is a possible implementation of the minimizations above. For example, a column is a set of bits on the same bit position in a set of words, e.g., with 1 word per row.

This method could be combined with other methods, like continuous inversion.

This method could also be used with software. When data in the PUF area would be restricted to specific static data that is not accessed a lot, special read/write routines, and a timed update routine can be used to change the random mask every now and then. The data use restriction is because reading and writing data must be done with application of the current mask, which could be relatively slow, and is not compatible with variable declarations etc.

Masking is preferably done by applying an XOR operation. This is not necessary, masking may also be done by arithmetically adding the mask, and unmasking by subtracting. Masking may also obfuscate the cached memory, e.g., by masking through a non-linear operator, e.g., a layer of S-boxes.

Masking of the cache or of other memory may be done in hardware or in software, or as a hybrid. For example, software may comprise so-called microinstructions for controlling the cache. Deriving the secret key may be implemented in the processor circuit, examples of which are shown herein.

Device 100 may have a user interface, which may include well-known elements such as one or more buttons, a keyboard, display, touch screen, etc. The user interface may be arranged for accommodating user interaction for performing an action, e.g., to initiate booting of the device.

Typically, device 100 comprises a microprocessor (not separately shown) which executes appropriate software stored at device 100; for example, that software may have been downloaded and/or stored in a corresponding memory, e.g., a volatile memory such as RAM or a non-volatile memory such as Flash (not separately shown). Alternatively, device 100 may, in whole or in part, be implemented in programmable logic, e.g., as field-programmable gate array (FPGA). Device 100 may be implemented, in whole or in part, as a so-called application-specific integrated circuit (ASIC), i.e. an integrated circuit (IC) customized for their particular use. For example, the circuits may be implemented in CMOS, e.g., using a hardware description language such as Verilog, VHDL etc.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only.

Figure 3:
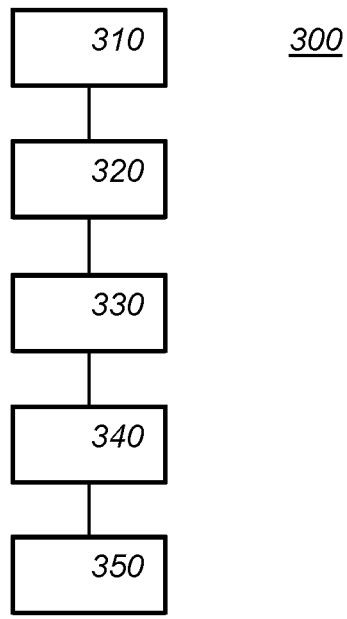

An aspect of the invention is a caching method. FIG. 3 schematically shows an example of an embodiment of a cryptographic method 300. Shown in FIG. 3 are the following:
- caching 310 a further memory in a cache memory,
- generating 320 the mask and storing 330 the mask in the mask storage,
- writing 340 a content of the further memory in the cache memory masked with the mask stored in the mask storage,
- reading 350 a content of the cache memory unmasked with the mask stored in the mask storage.

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. Moreover, a given step may not have finished completely before a next step is started.

A caching method according to the invention may be executed in hardware or using software, which comprises instructions for causing a processor system to perform the method.

It will be appreciated that the invention also extends to computer programs, particularly computer programs on or in a carrier, adapted for putting the invention into practice. The program may be in the form of source code, object code, a code intermediate source, and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

Figure 4A:
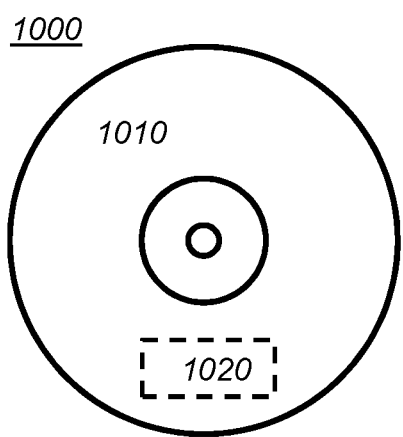

FIG. 4a shows a computer readable medium 1000 having a writable part 1010 comprising a computer program 1020, the computer program 1020 comprising instructions for causing a processor system to generate a key from the power-up content of the cache memory. In addition, the processor may be configured to update the masks of the cache. In an embodiment, masking and unmasking of a cache or cache block is done in hardware.

The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable.

Figure 4B:
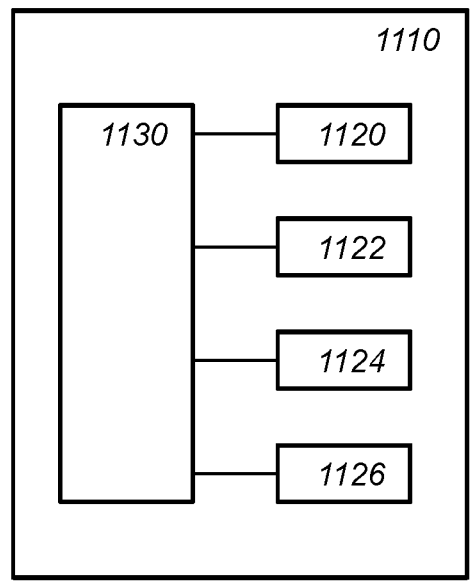

FIG. 4b shows in a schematic representation of a processor system 1140 according to an embodiment. The processor system comprises one or more integrated circuits 1110. The architecture of the one or more integrated circuits 1110 is schematically shown in FIG. 4b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Part of memory 1122 may be a cache memory.

Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, the cryptographic device may comprise a processor circuit and a memory circuit, the processor being arranged to execute software stored in the memory circuit. For example, the processor circuit may be an Intel Core i7 processor, ARM Cortex-R8, etc. In an embodiment, the processor circuit may be ARM Cortex M0. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

The invention claimed is:

1. An electronic cryptographic device, comprising
   a cache memory configured to cache a further memory, the cache memory being configurable as a cache or as a directly addressable memory, the cache memory being configured as a directly addressable memory upon power-up of the device, the cache memory comprising a PUF content upon power-up, the cryptographic device being configured to derive a cryptographic key from the PUF content, and to configure the cache memory as a cache,
   a mask storage configured for storing a mask,
   a mask generator configured to generate the mask and to store the mask in the mask storage,
   a cache write mechanism configured to, when the cache memory is configured as a cache, write a content of the further memory in the cache memory masked with the mask stored in the mask storage, and
   a cache read mechanism configured to, when the cache memory is configured as a cache, read a content of the cache memory unmasked with the mask stored in the mask storage.

2. A cryptographic device as in claim 1, wherein the device is configured to decrypt boot software stored in a memory of the device, and to execute the decrypted boot software.

3. A cryptographic device as in claim 1, wherein the cache memory is divided in multiple blocks, wherein
   the mask storage is configured to store multiple masks, each block having a mask associated thereto from the mask storage.

4. A cryptographic device as in claim 3 comprising a cache controller configured to send a new-signal to the mask generator upon invalidation of a cache block, the mask associated with the invalidated cache block being updated by the mask generator.

5. A cryptographic device as in claim 1, wherein masking and unmasking comprises an XOR operation.

6. A cryptographic device as in claim 1, wherein the mask generator is configured to generate a random mask.

7. A cryptographic device as in claim 1, wherein a new mask generated by the mask generator to update a mask associated with a cache block depends on at least one from the list of:
   a current content of the cache block, and
   the Hamming distance between the new mask (extend (M1)) and the exclusive-or of the inverse of the current content of a cache block (NOT(C0)) and the newly written data (D1).

8. A cryptographic device as in claim 1, wherein the new mask is computed as M1=NOT(C0) XOR D1, wherein D1 is the newly written data, C0 is the current contents of a cache block, and M1 is the new mask.

9. A cryptographic device as in claim 1, wherein the mask storage content is extended before masking or unmasking.

10. A cryptographic device as in claim 9, wherein the mask storage content is extending by repeating the mask storage content.

11. A cryptographic device as in claim 9, wherein the new mask M1 is computed as
    Minimize hamming_weight(NOT(C0) XOR D1 XOR extend(M1)), or
    Minimize Hamming_distance(NOT(C0) XOR D1, extend (M1), or
    an estimation of these minimizations.

12. A cryptographic device as in claim 9, wherein the device is configured to, per mask bit before the extending:
    a. Determine the column of bits that are masked by the mask bit after extending, and calculate the hamming weight (HW) of the corresponding column of bits in the exclusive-or of the inverse of the current content of a cache block (NOT(C0)) and the newly written data (D1)
    b. Determine the mask bit as round(HW/nr_bits in column).

13. A cryptographic device as in claim 1, comprising an inversion unit configured to periodically invert the cache block content.

14. An electronic cryptographic method, comprising:
    deriving a cryptographic key from a PUF content, the PUF content being comprised in a cache memory upon power-up, the cache memory being configurable as a cache or as a directly addressable memory, the cache memory being configured as a directly addressable memory upon power-up,
    configuring the cache memory as a cache,
    caching a further memory in the cache memory,
    generating a mask and storing the mask in a mask storage,
    when the cache memory is configured as a cache, writing a content of the further memory in the cache memory masked with the mask stored in the mask storage, and
    when the cache memory is configured as a cache, reading a content of the cache memory unmasked with the mask stored in the mask storage.

15. A non-transitory computer readable medium comprising non-transitory data representing instructions to cause a processor system to perform:
    deriving a cryptographic key from a PUF content, the PUF content being comprised in a cache memory upon power-up, the cache memory being configurable as a cache or as a directly addressable memory, the cache memory being configured as a directly addressable memory upon power-up;
    configuring the cache memory as a cache;
    caching a further memory in the cache memory;
    generating a mask and storing the mask in a mask storage;

when the cache memory is configured as a cache, writing a content of the further memory in the cache memory masked with the mask stored in the mask storage; and when the cache memory is configured as a cache, reading a content of the cache memory unmasked with the mask stored in the mask storage.

\* \* \* \* \*